W. A. PEFFER.
TROLLEY POLE ATTACHMENT.
APPLICATION FILED OCT. 24, 1910.
994,030.
Patented May 30, 1911.
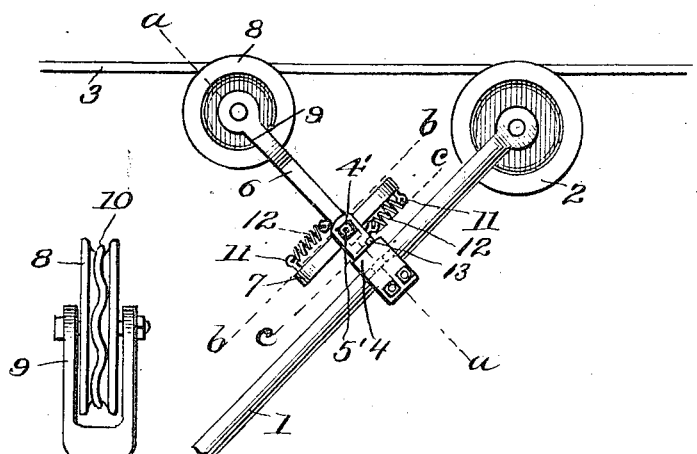
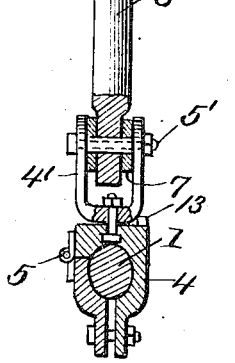
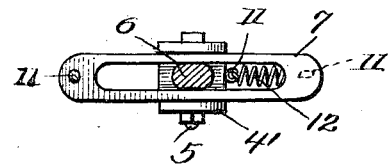
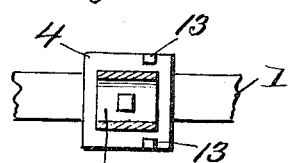
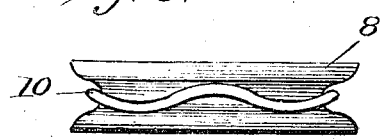
Inventor
William A. Peffer
Witnesses
L. D. Lindsay
Chas. C. Richardson
By Wm. C. McIntire
Attorney

UNITED STATES PATENT OFFICE.

WILLIAM A. PEFFER, OF LOUISVILLE, KENTUCKY.

TROLLEY-POLE ATTACHMENT.

994,030. Specification of Letters Patent. Patented May 30, 1911.

Application filed October 24, 1910. Serial No. 588,808.

*To all whom it may concern:*

Be it known that I, WILLIAM A. PEFFER, a citizen of the United States, residing at Louisville, in the county of Jefferson and State of Kentucky, have invented certain new and useful Improvements in Trolley-Pole Attachments; and I do hereby declare the following to be a full, clear, and exact description of the invention, such as will enable others skilled in the art to which it appertains to make and use the same.

This invention relates to new and useful improvements in trolley pole attachments.

An object of this invention is to provide a device of this character adapted to engage the trolley wire in advance of the usual trolley wheel and remove ice or the like from the said wire.

Another object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more particularly described, claimed and illustrated in the accompanying drawing, in which—

Figure 1 is a side elevation of a trolley pole with my improved attachment applied thereto; Fig. 2 is a sectional view taken on the line $a$—$a$ of Fig. 1; Fig. 3 is a sectional view taken on the line $b$—$b$ of Fig. 1; Fig. 4 is a sectional view taken on the line $c$—$c$ of Fig. 1, and Fig. 5 is a plan view of the trolley wire engaging wheel removed from the improved attachment.

Referring to the drawings by characters of reference, the numeral 1 designates generally the upper portion of a trolley pole, provided at its upper terminal with the usual wheel 2, which engages the trolley wire 3. A substantially U-shaped clamp 4, one leg of which is hinged as at 5, for the purpose of engaging the said trolley pole, is bolted or otherwise secured thereto, and provided upon one end with a swiveled bracket 4'. A pin 5' passes through the upper ends of this bracket 4' and secures thereto a swinging arm 6, together with a substantially rectangular-shaped yoke 7, for a purpose to be later disclosed.

A flanged wheel 8 is rotatably mounted within the upper bifurcated end 9 of the arm 6, and has formed upon the hub thereof a curved rib 10 adapted to be normally pressed into engagement with the trolley wire 3, for the purpose of removing any ice, or any other undesired matter which might collect thereon and hinder the operation of the trolley wheel 2. Oppositely extending eyes 11 are formed upon the opposite ends of the yoke 7 and are connected by springs 12 to the arm 6 and bracket 4 respectively. Stops 13 are formed upon opposite sides of the end of the clamp and serve to limit the lateral movement of the bracket.

From the foregoing disclosure it will be manifest that when this attachment is adjusted upon the trolley pole so that the wheel 8 is normally engaged by the wire 3 through the medium of the springs 12 that an attachment is provided for which will fulfil all of the necessary requirements of such a device. It will also be apparent that in case the said wheel 8 contacts with any hard object upon the wire 3, the springs 12 will permit the arm 6 to swing downward, thus preventing the disengagement of the trolley wheel 2 from the said wire 3. The swiveled bracket 4 will permit the lateral movement of the wheel 8 when the trolley is traveling around sharp curves, said movement being limited by the stops 13, which prevents the wheel 8 from swinging far enough to become disengaged from the wire 3.

Having thus fully described this invention, what I claim as new and desire to secure by Letters Patent is:

In a device such as described the combination with a trolley pole and wheel, of a clamp secured to the pole, a bracket swiveled upon the clamp, a yoke and an arm pivoted to the said bracket, a wheel carried by the arm, springs connecting the yoke to the bracket and arm for normally holding the wheel into engagement with the trolley wire, and a rib formed upon the periphery of the wheel for the purpose of removing any undesired matter from the trolley wire, substantially as and for the purposes hereinbefore described.

In testimony whereof I affix my signature in presence of two witnesses.

WILLIAM A. PEFFER.

Witnesses:
JOHN HOFFER,
P. G. DAWSON.